United States Patent Office 2,749,331
Patented June 5, 1956

2,749,331

SYNTHETIC LINEAR POLYAMIDES OBTAINED BY THE BASE-CATALYZED POLYMERIZATION OF UNSATURATED AMIDES

David S. Breslow, New Castle County, Del., assignor to Hercules Powder Company, Wilmington, Del., a corporation of Delaware No Drawing. Application July 5, 1952,
Serial No. 297,387

12 Claims. (Cl. 260—89.7)

This invention relates to new synthetic linear polyamides and to the process for preparing such polymers by the addition polymerization of an ethylenically unsaturated amide.

It is well-known that acrylamide, methacrylamide, etc., may be self-polymerized or copolymerized with other unsaturated compounds. However, the polymerization which takes place is that resulting from a free radical mechanism; i. e., by heat or in the presence of a peroxidic catalyst, the polymerization taking place between two ethylene double bonds and it has not previously been possible to produce synthetic linear polyamides by the polymerization of an ethylenically unsaturated amide. Synthetic linear polyamides have previously been prepared only by the condensation of amino acids or the lactam or anhydride thereof, particularly those containing at least 6 carbon atoms, or by the condensation of a dicarboxylic acid with an organic diamine.

Now, in accordance with this invention, it has been found that new synthetic linear polyamides may be prepared by the base catalyzed polymerization of acrylamide or other ethylenically unsaturated amides having the general formula

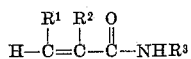

where $R^1$ may be hydrogen or alkyl, $R^2$ may be hydrogen, alkyl, aryl, or aralkyl, and $R^3$ is one of the group consisting of H, —NH$_2$, —(CH$_2$)$_n$—OH, —(CH$_2$)$_n$—SH, —(CH$_2$)$_n$—NH$_2$, (CH$_2$)$_n$—CONH$_2$, (CH$_2$)$_n$—SO$_2$NH$_2$, —C$_6$H$_4$CONH$_2$, —C$_6$H$_4$CH$_2$CONH$_2$, and
—cyclohexyl—CONH$_2$ where $n$ is an integer greater than one.

The following examples will illustrate the preparation of synthetic linear polyamides in accordance with this invention. All parts and percentages are by weight unless otherwise indicated.

Example 1

Ten parts of a powdered sublimed acrylamide was added to an agitated solution of 0.02 part of phenyl β-naphthylamine in 100 parts of anhydrous pyridine, which solution had previously been heated to 100° C. As soon as the acrylamide had completely dissolved, a solution of 0.1 part of sodium in 8 parts of tert-butanol was added. The polymer began to precipitate within 3 minutes; however, heating of the reaction mixture was continued for 16 hours to insure complete polymerization. The polymer was then removed by filtration, extracted with boiling water and then was dried in vacuo at 80° C. The polymer so obtained was insoluble in water but was soluble in formic acid, boiling ethylene glycol, boiling glycerol, and boiling phenol. It melted at 340° C. with decomposition. A 1% solution of this water-insoluble polymer in 90% formic acid had a specific viscosity of 0.66 and in 100% formic acid had a specific viscosity of 0.99.

Example 2

A mixture of 40 parts of sublimed acrylamide and 0.04 part hydroquinone was added to a solution of 0.4 part of sodium in 320 parts of boiling tert-butanol. A precipitate soon formed but heating under reflux was continued for 15 hours. The precipitate was removed by filtration and then was dissolved in 200 parts hot water. The small amount of insoluble material which was present was removed by filtration. The aqueous solution of the polymer was poured into methanol, whereby a gelatinous precipitate of the polymer was formed, which precipitate was then isolated by centrifugation. The polymer was redissolved in water and again precipitated by pouring in methanol and finally was dried in vacuo as before. This polymer on analysis was found to contain 18.6% nitrogen. A 1% solution of it in water had a specific viscosity of 0.20.

Example 3

A solution of 0.4 part of sodium in 15 parts of tert-butanol was added to a mixture of 40 parts acrylamide and 0.04 part of hydroquinone. The tert-butanol was removed from the reaction mixture by distillation in vacuo at 40° C. The reaction mixture was then heated to form a homogeneous melt whereupon a vigorous exothermic reaction set in, the reaction being complete within 2 to 3 minutes. The solid foam was then extracted with boiling water for 1 hour. A 1% solution of this water-insoluble polymer in 100% formic acid had a specific viscosity of 0.23.

Example 4

Example 3 was repeated, except that methacrylamide was substituted for the acrylamide used in that example, and phenyl β-naphthylamine was used as the inhibitor in place of hydroquinone. Again a water-insoluble polymer was obtained. The specific viscosity of a 1% solution of it in 100% formic acid was 0.092.

Example 5

Example 3 was repeated, except that crotonamide was substituted for the acrylamide used in that example, and phenyl β-naphthylamine was used as the inhibitor. The polymer was insoluble in water. A 1% solution of it in 90% formic acid had a specific viscosity of 0.066.

Example 6

Example 1 was repeated except that sodamide was used as the catalyst in place of the sodium tert-butoxide used in that example. A 1% solution of the water-insoluble polymer so obtained in 90% formic acid had a specific viscosity of 0.63.

Example 7

Example 1 was repeated except that dioxane was used as the solvent and sodium as the catalyst. A 1% solution of the water-insoluble polymer so obtained in 100% formic acid had a specific viscosity of 0.88.

Any amide containing an activated ethylene double bond; i. e., an ethylene double bond in the α-position to the carbonyl group of the amido group, and no other olefinic unsaturation, and an active hydrogen atom may be polymerized in accordance with this invention in the presence of a strongly basic catalyst and obtain a linear polyamide. Amides which will undergo this polymerization reaction are those having the general formula

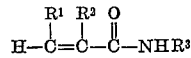

where $R^1$ is hydrogen or alkyl, $R^2$ is hydrogen, alkyl, aryl, or aralkyl, and $R^3$ is one of the group consisting of

H, —NH₂, —(CH₂)ₙOH, —(CH₂)ₙSH, —(CH₂)ₙNH₂, —(CH₂)ₙ—CONH₂, —(CH₂)ₙ—SO₂NH₂,

—C₆H₄CONH₂

—C₆H₄CH₂CONH₂, and —cyclohexyl—CONH₂, where $n$ is an integer greater than one. All amides having such a formula meet the requirement of having an activated ethylene double bond and an active hydrogen atom, the hydrogen attached to the nitrogen, oxygen, or sulfur atom in the said R³ groups being such an active hydrogen atom. Exemplary of the amides which may be polymerized in accordance with this invention are the ethylenically unsaturated amides, such as acrylamide, methacrylamide, ethacrylamide, α-phenylacrylamide, crotonamide, 2-pentenoic acid amide, etc.; unsaturated hydrazides, such as acrylhydrazides, methacrylhydrazides, etc., and unsaturated substituted amides wherein the radical attached to the nitrogen atom contains an active hydrogen atom, as, for example, N-ethanol acrylamide, N-ethanol methacrylamide, N-thioethanol acrylamide, N-aminoethyl acrylamide, N-(β-carbamylethyl)acrylamide, N-(β-sulfamylethyl)acrylamide, N-(p-carbamylphenyl)acrylamide, N-(p-carbamylmethylphenyl)acrylamide, N-(4-carbamylcyclohexyl)acrylamide, etc.

The polymerization reaction which takes place in the presence of the basic catalyst may be considered as an addition reaction, the active hydrogen of one molecule adding to the ethylene double bond of another molecule, etc. Thus, the polymer prepared from acrylamide or methacrylamide will correspond to the general formula

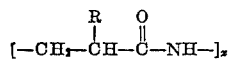

the polymer from an amide such as N-ethanol acrylamide will have the general formula

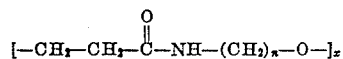

etc. That the polymerization has taken place by addition of the active hydrogen atom of one molecule to the double bond of another and not between the double bonds of two molecules has been shown by the fact that the polymer is a linear polyamide. Had the polymerization occurred by the expected free radical type polymerization, the polymer would have the following general formula

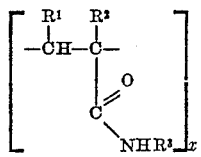

Proof that the polymers obtained by the process of this invention have the former type of formula has been shown by the fact that analysis of the polymer showed the absence of any

groups which would have been present had any polymerization taken place by a radical induced polymerization. Even more positive proof is the fact that on hydrolysis of these polymers, β-alanine from the acrylamide polymer or a substituted β-alanine from the other acrylamide polymers is obtained, which product could only be obtained if the polymers had the first of the above two types of structures.

The polymerization of the amides containing activated eylthene double bonds and an active hydrogen atom is carried out by contacting the amide with a strongly basic catalyst under substantially anhydrous conditions. Any strongly basic catalyst may be used to catalyze the polymerization. Exemplary of the basic catalysts that may be used are the strongly basic hydroxides, as, for example, the alkali metal hydroxides such as sodium and potassium hydroxide, and quaternary ammonium hydroxides such as benzyltrimethylammonium hydroxide; the alkali metal alkoxides such as sodium methoxide, sodium ethoxide, sodium tert-butoxide, etc., and the corresponding potassium alkoxides; the alkali metal amides such as sodamide, potassium amide, etc.; alkali metal hydrides such as sodium hydride, etc.; the alkali metal salts of triphenylmethane such as triphenylmethyl sodium, etc.; and the alkali metals themselves such as sodium, potassium, etc. Thus, the strongly basic catalyst may be defined as one having a basic strength that is at least as strong as that of potassium hydroxide. The basic compound acts as a true catalyst for this polymerization reaction and hence any amount of it may be used from a catalytic amount up to a large excess, if desired. In general, an amount of from about 0.03% to about 1% based on the weight of the monomer is used. Larger amounts may be used but are not believed to serve any useful purpose.

As may be seen from the foregoing examples, the polymerization may be carried out by either a bulk or a solution process. In either case, it should be carried out in a nonaqueous medium; i. e., under substantially anhydrous conditions to avoid decomposition of the basic catalyst and addition of water to the double bond of the amide. Solution polymerization is frequently desirable since the temperature, molecular weight, etc., are more easily controlled in such a process. For example, lower molecular weight polymers are obtained when a dilute solution of monomer is polymerized, and the molecular weight of the polymer is higher if a more concentrated solution of monomer is used or if the polymerization is carried out in the absence of a diluent. In general, the amount of solvent used will be such as to provide a solution containing from about 2% to about 50% of monomer, and preferably from about 10% to about 20% of monomer. Any organic solvent which is inert under the polymerization conditions may be used as the polymerization medium; i. e., any solvent which is inert to the basic catalyst and to the unsaturated amide. Suitable inert organic diluents which may be used are the hydrocarbon solvents, such as hexane, heptane, octane, benzene, toluene, etc.; tertiary alcohols, such as tert-butanol, tert-amyl alcohol, etc.; ethers, such as dioxane, dibutyl ether, diphenyl ether, etc.; and basic solvents, such as pyridine, quinoline, etc. In addition to the organic solvents, an anhydrous solvent such as liquid ammonia may also be used.

The temperature at which the reaction is carried out may be varied over a wide range, depending upon the monomer being polymerized, the activity of the catalyst, whether a solvent is used, etc., and the degree of polymerization desired. For example, if the reaction is carried out in liquid ammonia, temperatures as low as —40° C. may be used with sodamide as the catalyst. With bulk polymerization or polymerization in an inert organic diluent, temperatures within the range of from about 25° C. to about 200° C. may be used, and more preferably a temperature within the range of from about 80° C. to about 110° C. will be used.

In the same way the amount of time required for the polymerization will depend upon the conditions used for the reaction and the degree of polymerization desired. Usually when the polymerization is carried out in bulk, the reaction is complete within a few minutes. If the polymerization is carried out in solution, the amount of time required for the reaction may vary from ten minutes to several days, depending upon the monomer being polymerized and the other conditions used for the polymerization. For example, if one or more of the hydrogens attached to the carbons of the ethylene double bond is substituted, such a compound will require a longer time for complete polymerization.

In carrying out the polymerization reaction of this invention, it is frequently desirable to add an inhibitor for radical-induced polymerization. This is particularly true if the monomer being polymerized is one which easily undergoes thermal polymerization. In the case of monomers which are more stable, it is not necessary to use an inhibitor. Any of the compounds which are well-known to inhibit radical-induced polymerization may be used, as, for example, hydroquinone, quinone, phenyl β-naphthylamine, etc. If a high molecular weight polymer is desired, it is usually preferable to then use a non-hydroxylic inhibitor. The amount of such an inhibitor which may be added in the event one is used, may vary over a wide range, but generally is within the range of from about 0.005% to about 0.1% based on the weight of the monomer being polymerized.

The method by which the polymer is separated and purified will, of course, depend upon the process used in obtaining it and the type of polymer which is obtained. If the polymerization reaction is carried out in an inert organic diluent in which the polymer is insoluble, it will precipitate and may be removed by filtration, centrifugation, etc. If the polymer which is obtained is one which is insoluble in water, it may easily be purified by extracting it with a liquid that is a solvent for the catalyst and the monomer but which is not a solvent for the polymer. Frequently, water may be used for this purpose. In the case of those polymers which are soluble in water, they may usually be purified by dissolving them in a small amount of water and then neutralizing this aqueous solution with a mild acid, such as acetic acid, and precipitating the polymer by pouring the neutralized aqueous solution into a water-miscible alcohol, such as methanol, ethanol, etc.

The properties of the polymers obtained by the process, in accordance with this invention, will vary depending upon the monomer which is being polymerized and the molecular weight of the polymer. By varying the reaction conditions, polymers of different molecular weights can be obtained starting with the same monomer. For example, the polymer obtained by the base catalyzed polymerization of acrylamide will be soluble in water and in glacial acetic acid if it has a relatively low molecular weight, but at higher molecular weights it will be insoluble in these solvents and soluble only in such solvents as formic acid, boiling ethylene glycol, boiling glycerol, and boiling phenol. Thus, the process of this invention may be operated to produce either water-soluble or water-insoluble polymers, but it is of particular importance in the production of water-insoluble linear polyamides. In general, these polymers are white solids with high melting points, a highly polymerized acrylamide having a melting point of 340° C. Such polymers from acrylamide are highly crystalline as has been shown by X-ray diffraction diagrams. Thus, they may be used in any application calling for a nylon-type polymer. For example, the water-insoluble polymers having high molecular weights prepared by the process of this invention may be used as plastics, molding resins, for the preparation of films, for the preparation of fibers, etc. Since they will, in general, react with formaldehyde, they may also be used in various textile applications. An important use for the polymers produced in accordance with this invention from acrylamide is in the synthesis of β-alanine since these polymers may be hydrolyzed by heating them with an aqueous solution of an acid or base to produce the free β-amino acid.

What I claim and desire to protect by Letters Patent is:

1. The process of preparing a synthetic linear polyamide which comprises contacting under substantially anhydrous conditions an amide, containing as its only olefinic unsaturation an ethylene double bond in the alpha position to the amide carbonyl radical and also containing active hydrogen, at least one of which is attached to the amido nitrogen, with a strongly basic catalyst selected from the group consisting of alkali metals, alkali metal hydroxides, quaternary ammonium hydroxides, alkali metal alkoxides, alkali metal amides, alkali metal hydrides, and alkali metal aralkyls, said basic catalyst being the sole polymerization catalyst present and said amide being the sole polymerizable material present.

2. The process of preparing a synthetic linear polyamide which comprises contacting under substantially anhydrous conditions an amide, containing as its only olefinic unsaturation an ethylene double bond in the alpha position to the amide carbonyl radical and also containing active hydrogen, at least one of which is attached to the amido nitrogen, with a strongly basic catalyst, said basic catalyst being the sole polymerization catalyst present and characterized by having a basic strength at least as strong as that of potassium hydroxide, and said amide being the sole polymerizable material present.

3. The process of preparing a synthetic linear polyamide which comprises contacting under substantially anhydrous conditions an amide, containing as its only olefinic unsaturation an ethylene double bond in the alpha position to the amide carbonyl radical and also containing active hydrogen, at least one of which is attached to the amido nitrogen, with a strongly basic catalyst at a temperature of from about 25° C. to about 200° C., said basic catalyst being the sole polymerization catalyst present and characterized by having a basic strength at least as strong as that of potassium hydroxide, and said amide being the sole polymerizable material present.

4. The process of preparing a synthetic linear polyamide which comprises contacting a substantially anhydrous solution of an amide, containing as its only olefinic unsaturation an ethylene double bond in the alpha position to the amide carbonyl radical and also containing active hydrogen, at least one of which is attached to the amido nitrogen, in an inert organic solvent with a strongly basic catalyst at a temperature of from about 25° C. to about 200° C., said basic catalyst being the sole polymerization catalyst present and characterized by having a basic strength at least as strong as that of potassium hydroxide, and said amide being the sole polymerizable material present.

5. The process of preparing a synthetic linear polyamide which comprises contacting acrylamide under substantially anhydrous conditions with a strongly basic catalyst at a temperature of from about 25° C. to about 200° C., said basic catalyst being the sole polymerization catalyst present and characterized by having a basic strength at least as strong as that of potassium hydroxide, and said acrylamide being the sole polymerizable material present.

6. The process of preparing a synthetic linear polyamide which comprises contacting methacrylamide under substantially anhydrous conditions with a strongly basic catalyst at a temperature of from about 25° C. to about 200° C., said basic catalyst being the sole polymerization catalyst present and characterized by having a basic strength at least as strong as that of potassium hydroxide, and said methacrylamide being the sole polymerizable material present.

7. The process of preparing a synthetic linear polyamide which comprises contacting crotonamide under substantially anhydrous conditions with a strongly basic catalyst at a temperature of from about 25° C. to about 200° C., said basic catalyst being the sole polymerization catalyst present and characterized by having a basic strength at least as strong as that of potassium hydroxide, and said crotonamide being the sole polymerizable material present.

8. The process of preparing a synthetic linear polyamide which comprises contacting acrylamide under substantially anhydrous conditions with an alkali metal alkoxide at a temperature of from about 25° C. to about 200° C., said amide being the sole polymerizable material present.

9. The process of preparing a synthetic linear polyamide which comprises contacting methacrylamide under substantially anhydrous conditions with an alkali metal alkoxide at a temperature of from about 25° C. to about 200° C., said amide being the sole polymerizable material present.

10. The process of preparing a synthetic linear polyamide which comprises contacting crotonamide under substantially anhydrous conditions with an alkali metal alkoxide at a temperature of from about 25° C. to about 200° C., said amide being sole polymerizable material present.

11. The process of preparing a synthetic linear polyamide which comprises contacting acrylamide under substantially anhydrous conditions with an alkali metal at a temperature of from about 25° C. to about 200° C., said amide being the sole polymerizable material present.

12. The synthetic linear polyamide produced by the process of claim 5.

References Cited in the file of this patent

UNITED STATES PATENTS

| | | |
|---|---|---|
| 2,458,355 | Dickey | Jan. 4, 1949 |
| 2,559,855 | Dickey et al. | July 10, 1951 |
| 2,594,560 | Howard | Apr. 29, 1952 |
| 2,595,907 | Thomas et al. | May 6, 1952 |
| 2,608,555 | Bullitt | Aug. 26, 1952 |
| 2,611,763 | Jones | Sept. 23, 1952 |
| 2,629,708 | Uraneck et al. | Feb. 24, 1953 |

OTHER REFERENCES

Schildknecht: "Vinyl and Related Polymers," page 314 published by Wiley, New York, 1952.